United States Patent [19]
Keigler et al.

[11] 3,940,096
[45] Feb. 24, 1976

[54] RE-ORIENTATION OF A SPACECRAFT RELATIVE TO ITS ANGULAR MOMENTUM VECTOR

[75] Inventors: John Edward Keigler, Princeton; Ludwig Muhlfelder, Livingston, both of N.J.

[73] Assignee: RCA Corporation, New York, N.Y.

[22] Filed: Nov. 27, 1974

[21] Appl. No.: 527,836

[52] U.S. Cl. ............................................. 244/165
[51] Int. Cl.² ............................................. B64G 1/10
[58] Field of Search .......... 244/164, 165, 166, 169, 244/170, 171, 3.2, 3.23

[56] References Cited
UNITED STATES PATENTS

| | | | |
|---|---|---|---|
| 2,963,243 | 12/1960 | Rothe | 244/165 |
| 3,171,612 | 3/1965 | Hildebrant | 244/165 |
| 3,294,344 | 12/1966 | Rosen et al. | 244/169 |
| 3,591,108 | 7/1971 | Perkel | 244/165 |
| 3,695,554 | 10/1972 | Phillips | 244/170 |
| 3,767,139 | 10/1973 | Fischell | 244/165 |

FOREIGN PATENTS OR APPLICATIONS

| 1,503,751 | 10/1967 | France | 244/165 |
|---|---|---|---|

*Primary Examiner*—Trygve M. Blix
*Assistant Examiner*—Galen L. Barefoot
*Attorney, Agent, or Firm*—Edward J. Norton; Joseph D. Lazar

[57] ABSTRACT

The orientation maneuver of a bias momentum stabilized spacecraft is achieved without the need of attitude determination by sensors and gyros and the like and without the conventional spin-down and spin-up procedures. The spacecraft is provided with a momentum wheel mounted in perpendicular relation to the axis of maximum moment of inertia. The wheel is initially de-energized during the time the spacecraft is initially launched from the ground launching platform until it is desired to orient the spacecraft in the final orbit. The momentum wheel, when energized from zero rotation to increasing rotation speeds, causes the rotation of the spacecraft from spinning about the maximum moment of inertia axis to an axis parallel to the momentum wheel axis with the final convergence of the wheel axis to the momentum vector being effected by energy dissipation in a nutation damper.

4 Claims, 7 Drawing Figures

RE-ORIENTATION OF A SPACECRAFT RELATIVE TO ITS ANGULAR MOMENTUM VECTOR

BACKGROUND OF THE INVENTION

1. Field of the Invention

This invention relates to angular momentum stabilized spacecraft and in particular to re-orientation of such spacecraft from the injection attitude to the on-orbit mission attitude.

2. Description of the Prior Art

Spacecraft are launched from ground based launch platforms and propelled or carried into space by launch vehicles. The launch vehicle is sequentially separated into first, second, and third sections as required to finally inject the spacecraft into its own orbit with or without spin imparted to the spacecraft. For a geo-synchronous orbit (of some 19,000 nautical miles above the earth in a substantially equatorial plane) the spacecraft achieves an apparent non-moving position relative to a terrestrial antenna. Such spacecraft have provided a bus for communication systems of importance requiring however, for economic justification, extended life in such orbits. To extend the life of such spacecraft, inter alia, it is essential that the station keeping and orientation propellant reserves be utilized most efficiently. Heretofore, the achievement of the final mission attitude required that the spacecraft be re-oriented from its final orbit insertion attitude by means of elaborate procedures and complex electronic and thrusting devices. In one such system, as disclosed in U.S. Pat. No. 3,294,344, issued to Rosen et al., on Dec. 27, 1966, there is disclosed a body orientation maneuver from the initial spin axis to the final spin axis which is perpendicular to the initial spin axis, including a step in the maneuver of stopping the body from spinning.

In a NASA Report entitled, "Flywheel Stabilized, Magnetically Torqued Attitude Control System for Meteorological Satellites" — NASA — CR-232, May 1965, there is described a procedure (paragraph 3.7.4, "Completion of Alignment Process") for turning a spinning spacecraft from an unstable mode of operation (rotating about an axis different from the axis of maximum moment of inertia) to a stable mode by energizing a momentum wheel to achieve the desired 90° turn of the spacecraft.

Reference is made to a recent paper describing the Communication Technology Satellite (CTS) current being developed by the Communication Research Center of Canada jointly with the National Aeronautics and Space Administration (NASA) of the United States. The paper is published by the American Institute of Aeronautics and Astronautics as AIAA Paper No. 72-580, in April 1972, entitled "A High Power Communications Technology Satellite for the 12/14 GHz Band" by Franklin and Davidson. This CTS satellite is a bias momentum, three axis stabilized system. The spacecraft is re-oriented by first removing all angular momentum about the initial spin axis and then imparting momentum about a perpendicular axis as the momentum wheel is brought up to speed about this second axis. The CTS system requires an array of sun sensors, earth sensors, gyros, and thrusters, all coordinated to achieve controlled rates and orientation maneuvers on a programmed search and roll maneuver to effect the orientation desired. Such prior art systems for achieving the final orientation of a spacecraft require complex equipment and critical maneuvers. Such systems, being complex in both hardward as well as operational procedures, pose a high risk of potential malfunction.

SUMMARY OF THE INVENTION

A system of orienting a bias momentum stabilized spacecraft from a spin-stable configuration about the thrust axis is achieved while maintaining the total angular momentum of the spacecraft and thus retaining the fixed inertial attitude of the momentum vector. The momentum wheel mounted with its axis perpendicular to the initial spin axis is energized, causing the spacecraft body thereby to rotate through the 90° turn defined by the thrust vector axis and the momentum wheel axis whereby the wheel axis will then be in alignment with the momentum vector. The 90° rotation of the body axes with respect to the spatially fixed angular momentum vector is effected by the energy dissipation in the nutation dampers, spacecraft structure, and fuel tanks as the total dynamical system seeks its minimum energy state.

BRIEF DESCRIPTION OF THE DRAWING

FIG. 3 is a diagram showing the spacecraft in its final stable orientation;

DETAILED DESCRIPTION OF THE PREFERRED EMBODIMENTS

Figure 1:
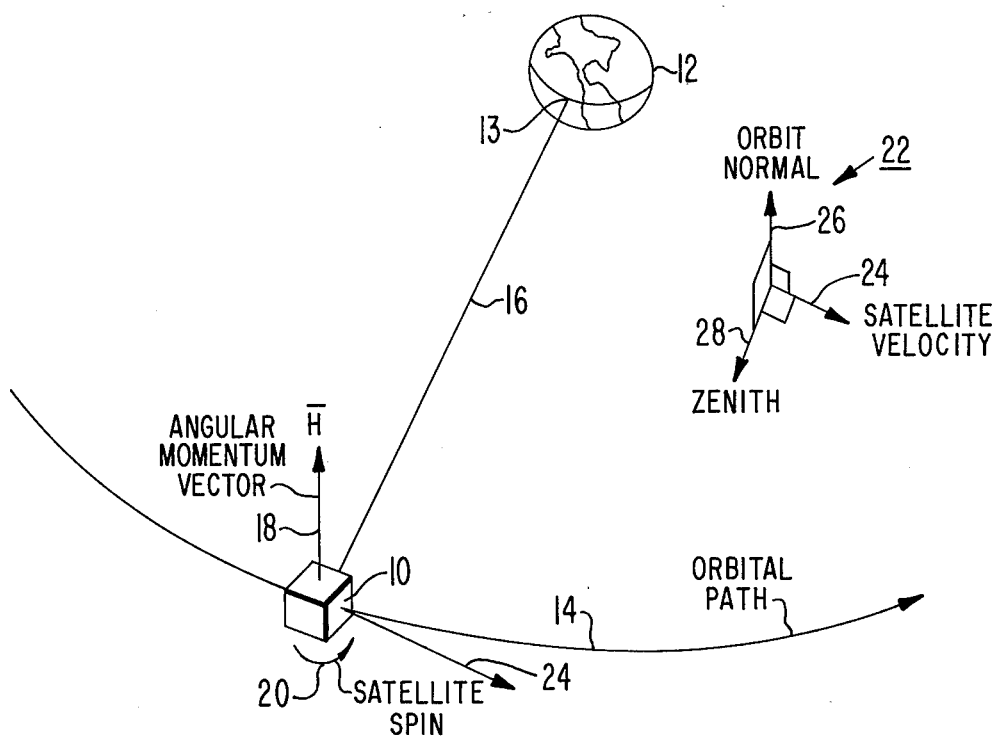
FIG. 1 is a diagram showing the spacecraft spin axis and angular momentum vector parallel to the orbit normal in an orbital path referenced to the earth.

A typical spacecraft launch sequence involves several events that occur in sequence following the lift off. The first phase of the launch includes the launch vehicle projecting the entire package comprising first and upper stages of the launch vehicle and the spacecraft to be put into orbit. When the spacecraft reaches the desired altitude and is in the appropriate orbit for final separation of the spacecraft from the last stage of the launch vehicle, the spacecraft may have a residual spin about the axis coincident with the thrust axis of the launch vehicle, the spin rate being determined by stability requirements of the final stage of the launch vehicle as well as the requirements of the spacecraft for the most favorable thermal and power environment. Attitude maneuvers by the reaction control sub-system (RCS) during this so-called transfer orbit are made as required to allow the spacecraft to coast into the first apogee, the spin axis being oriented normal to the orbit plane to improve command control.

The reaction control sub-system is energized after several orbits have been completed to provide the required orientation for an apogee motor operation such that the velocity change imparted by the apogee motor will both circularize the orbit and provide the requisite plane change. The apogee kick motor is then ignited to provide this vectoral change in velocity of the space vehicle in which the spacecraft is then in its final orbit with the desired orbit plane inclination. During this phase of the sequence, the spacecraft is still spinning at the rate imparted prior to separation from the launch vehicle. For stability and predictability of the spin axis during this phase, it is preferable, according to the present invention, that the spin axis be the axis of maximum moment of inertia.

The spacecraft is then by command to the RCS despun from the high spin of the final stage launch vehicle to a low rate such that the total angular momentum is within the momentum wheel stability range. (The mathematical relationship of these parameters will be described more fully hereafter). The spacecraft is thus maneuvered to orient the spin axis parallel to the orbit normal at a predetermined spin rate such that the angular momentum of the spacecraft corresponds to the in-orbit angular momentum selected for the mission. The momentum wheel or flywheel is energized to rotate at a gradually increasing rate whereby the total momentum of the vehicle is redistributed such that the angular momentum of the body of the spacecraft is reduced, the difference being transferred to (or absorbed by) the momentum wheel to conserve the momentum of the spacecraft system. As the momentum is thus exchanged, the spacecraft is maneuvered from the orientation of the spin axis which is initially oriented parallel to the momentum vector which is normal to the plane of the orbit, in a divergent nutational spiral whereby the spacecraft is moved so that the momentum wheel axis tends toward becoming parallel to the momentum vector. The final portion of the maneuver effects the momentum wheel axis to be moved into coincidence with the angular momentum vector, and thus, in coincidence with the spin axis of the vehicle, in a converging spiral by damping the residual nutation of the spacecraft. The steps subsequent to this 90° re-orientation maneuver are in accordance with conventional procedures. Thus, with the spacecraft in its stabilized position in the final orbit, solar arrays may be deployed so that the spacecraft may receive maximum solar energy for operation of the electronic systems. Signals provided from the earth horizon sensors or sun sensors can then be utilized to maintain one face of the spacecraft containing antennas or sensors pointing continuously toward the earth by proper control of the rotation speed of the momentum wheel.

Referring now to FIG. 1 there will be described in detail the various maneuvers that were summarized above. In FIG. 1 a satellite spacecraft 10 is shown in an orbital path 14 about the earth 12. The reference line of the spacecraft 10 to the earth 12 is indicated by the earth reference line 16. Spacecraft 10 is spinning (arrow 20) about the body axis of maximum moment of inertia (indicated by $I_s$ shown in FIGS. 2–5 to be described) which at this point in the sequence is parallel to the angular momentum vector (H) 18. The vector diagram 22 shows the mutual orthogonal relationships of the satellite velocity 24 to the orbit normal 26 and the zenity 28, the zenith 28 being colinear and extending radially outwardly from the earth reference line 16. In those applications where the spacecraft 10 is in its geo-synchronous orbit, the orbital path 14 will be the equatorial plane extending from the equator of the earth 12 and thus the satellite 10 in such an orbit, will appear to hover or be fixed about point 13 on the equator of earth 12. It will be understood that the re-orientation maneuver of this invention may be used in any orbit, and is not limited to the geo-synchronous orbit of the preferred embodiment.

Figure 2:
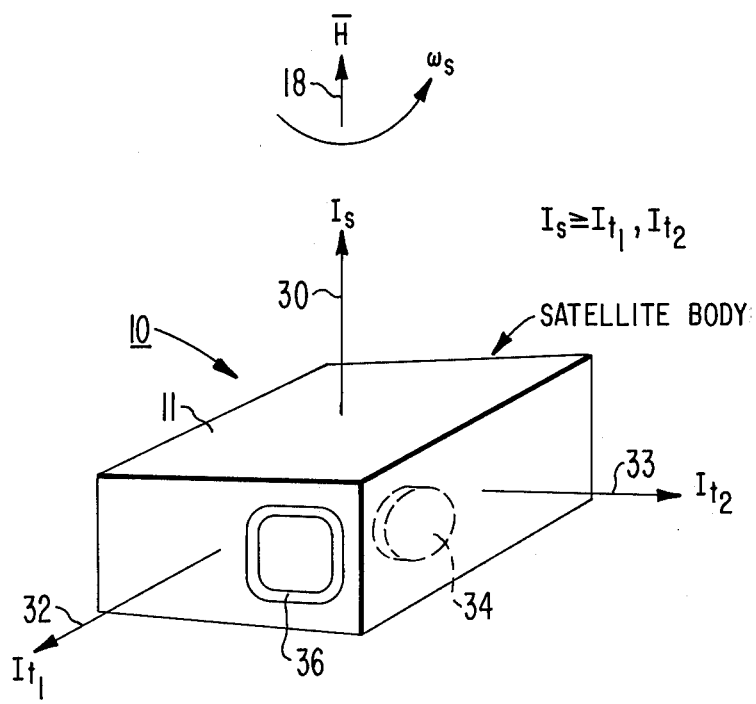
FIG. 2 is a diagram of a spacecraft body showing its orientation in a nutationally stable spin with the maximum moment of inertia axis ($I_s$) aligned with the angular momentum vector (H), the transverse mounted momentum wheel being in an unenergized, non-rotating state.

Reference is made to FIG. 2 wherein the spacecraft or vehicle 10 is shown in its nutationally stable spin attitude with the maximum moment of inertia axis ($I_s$) in alignment with the angular momentum vector (11). For the present description, the following definitions of the various terms will apply:

H is the total angular momentum of the vehicle 10 comprised of a body containing in addition to other components not essential to this invention, a momentum wheel 34 and a nutation damper 36. The angular moment vector is indicated by vector line 18, it being understood that in the diagrams the vectors indicated by a line with an arrowhead would represent a vector having both magnitude and direction relative to the appropriate coordinate axes. $I_s$ is the maximum moment of inertia of the spacecraft as indicated by vector line 30 in FIG. 2.

$I_{t_1}$ is the moment of inertia about one of the transverse axes of the body of the spacecraft as indicated by vector 32.

$I_{t_2}$ is the moment of inertia about another transverse axis of the body of the spacecraft as indicated by reference vector line 33, both of the transverse moments of inertia being orthogonal to each other and to the vector 30 representing the maximum moment of inertia $I_s$.

Both of the transverse moments of inertia ($I_{t_1}$ and $I_{t_2}$) are less than that about the initial spin axis, that is less than the amount of inertia $I_s$.

The designation of the axes used for the present description is intended to be general in nature. It will be recognized that in conventional satellite body axes designations that the axis of wheel 34 is coincident or parallel to the final or mission pitch axis of the spacecraft. The axes corresponding to the vectors 30 and 32 are respectively colinear or parallel with either one of the other of the yaw and roll axes. Nevertheless, the principle of the present invention is applicable to any bias momentum stabilized satellite system.

As indicated above, the spacecraft is designed to provide the maximum moment of inertia $I_s$ to be greater than either of the transverse moments of inertia $I_{t_1}$ and $I_{t_2}$. A typical value of relationship of these moments of inertia are such that the $I_s$ is about 5 to 20 percent greater than either of the transverse moments. The spacecraft 11 herein designated vehicle 11, consists of a body portion, or simply a body, a momentum wheel 34, and a suitable damper 36. The body of the vehicle 11 houses the conventional spacecraft components such as the power supply, the thruster propellant tanks, electronic apparatus, sensors, gyros, and the like, all forming the total package of the satellite or vehicle. Those components are not essential to the present invention and are not described in any further detail, except as will be included in the block diagrams of FIGS. 6 and 7. For further descriptions of such conventional spacecraft systems reference is made to U.S. Pat. No. 3,695,554, issued to K. J. Phillips on Oct. 3, 1972, and U.S. Pat. No. 3,830,447 issued to K. J. Phillips on Aug. 20, 1974, for descriptions of dual spin spacecraft provided with pitch loop controls including both active and passive nutation damping. For a description of a closed loop roll and yaw control for satellites, reference is made to U.S. Pat. No. 3,834,653, issued to Harold Perkel on Sept. 10, 1974. For a propulsion system suitable to a spacecraft according to the present invention, reference is made to U.S. Pat. No. 3,807,657 issued to Y. C. Brill on Apr. 30, 1974.

Further reference for a description of the principles of body-stabilized, momentum wheel attitude control systems reference is made to an article by Landon and Steward entitled, "Nutation Stability of an Axisymmetric Body Containing a Rotor," in the *Journal of Spacecraft And Rockets*, Vol. 1, 1964, pp. 682–684 and an article by H. Perkel, entitled, "Stabilite In A Three Axis Attitude Control System Using A Single Reaction Wheel," published in Chapter III, Vol 19, by Academic Press, 1966 in the article entitled, "Progress In Astronautics and Aeronautics."

Figure 3:
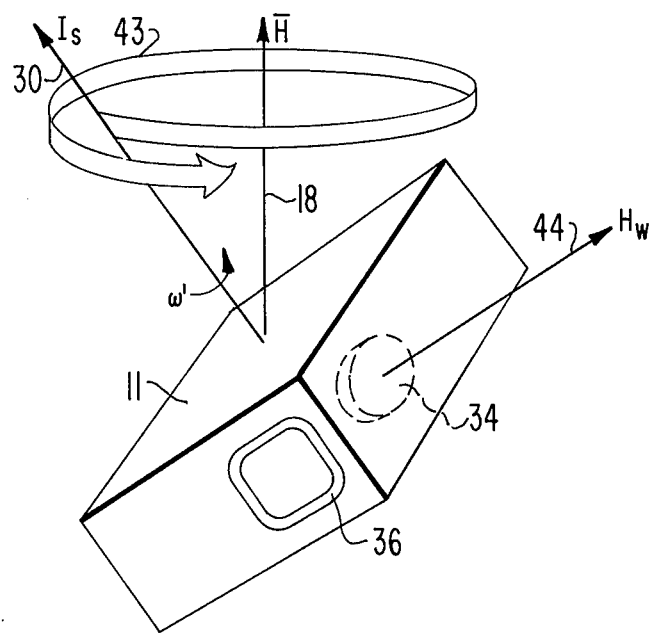
FIG. 3 is a schematic of the spacecraft shown in FIG. 2 with the spin axis ($I_s$) diverging, after the momentum wheel is energized, from the inertially fixed angular momentum vector (II), at a decreased body spin rate.
Figure 7:
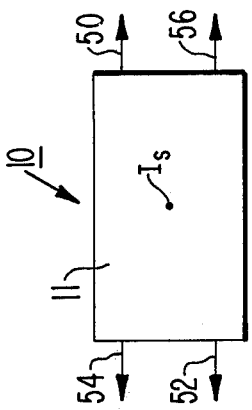
FIG. 7 is a diagram showing the position of thrusters on the spacecraft for reducing the initial spin-speed of the spacecraft.

The spacecraft condition in FIG. 2 is after separation from the launch vehicle, the apogee motor, if present, has been fired, the spacecraft has been despun by its own RCS from a high body spin rate associated with the launch vehicle to a low body rate about the axis 18. The manner in which the RCS is operated to despin the spacecraft may be accomplished by any known arrangement for changing the spin rate of a space vehicle by thrusters which exert a torque about the spin axis. For example, a set of thrusters 50, 52, 54, and 65 as shown in FIG. 7, may be mounted on the body of the vehicle 10, to develop any desired torque about the axis $I_s$ to despin the vehicle. Since the body is spinning about the axis of maximum inertia, nutation is removed by nutation damping as for instance by the passive fluid damper 36, aided by the sloshing of the propellant fuel in the propellant tanks, not shown, as well known in the art. In this mode (FIG. 2) the total angular momentum H is contained in rotation of the vehicle and equal to the product of the rotation rate $\omega_s$ times the maximum moment of inertia $I_s$. As the momentum wheel 36 is energized and gradually increased in rotation speed to a desired average value, for example a few thousand rpm, a torque is developed by the redistribution of momentum between the wheel (initially zero) and the body within the vehicle system whose total angular momentum is constant, viz., $\bar{H}$. This initial movement is illustrated in FIG. 3 wherein the vehicle 10 is shown diverging from the angular momentum vector 18 through the position indicated by vector line 43 representing the interim position of the axis whose inertia is $I_s$. This motion of the vector 30 is a divergent spiral causing the body spin axis to pass in the spiral through an angle in inertial space approaching 90°. The momentum of the wheel 34 is represented by the vector arrow 44 ($H_w$). As indicated above, the momentum of the wheel $H_w$ is equal to the moment of inertia of the wheel $I_w$ multiplied by the angular rotation of the wheel $\omega_w$.

Figure 4:
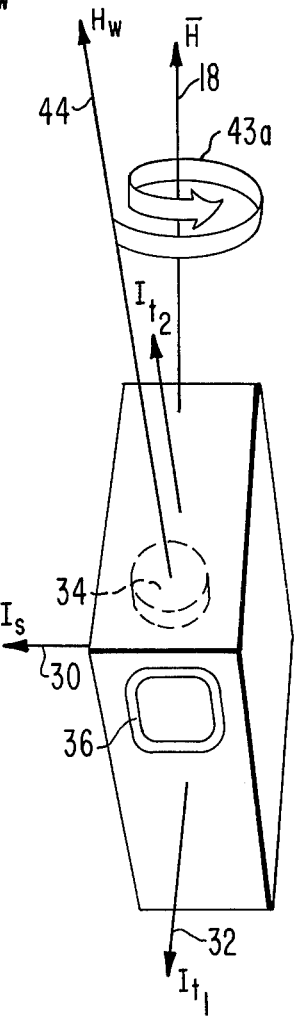
FIG. 4 is a schematic diagram of the spacecraft shown in FIGS. 2 and 3 with the momentum wheel axis and the spacecraft transverse axis converging to the inertially fixed angular momentum vector, complete convergence entails removal of residual nutation by energy dissipation in a nutation damper and the finite flexibility of the spacecraft structure and liquid fuel supply.

FIG. 4 illustrates the vehicle 10 in a position where the orientation of the momentum wheel axis 44 is converging to the inertially fixed angular momentum vector 18 as defined by the spin rate arrow 43a. Thus, the body axes vehicle has been moved in the spiral movement (43a) nearly 90° such that the original spin axis 30 is now approaching a transverse position, the axis $I_{t_2}$ converging to be coincident with the momentum vector 18 and parallel with the axis of the momentum wheel 34.

Figure 5:
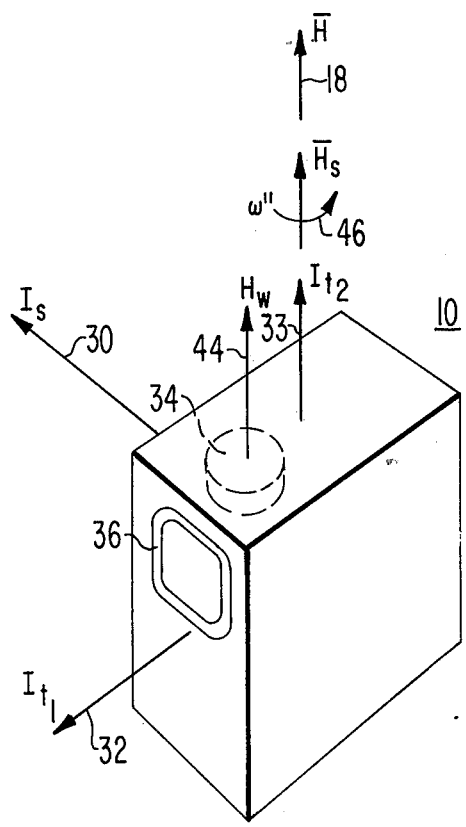

The final orientation of the vehicle 10 is shown in FIG. 5 with the transverse axis ($I_{t_2}$) and the momentum wheel axis 44 parallel to the inertially fixed momentum vector H (18). The spacecraft may have some residual body rotation as indicated by arrow 46 represented by $\omega''$ based on the following condition:

$$H = I_w \omega_w + I_{t_2} \omega'' \qquad (1)$$

the parameters for which relationship having been previously described. This final state of the vehicle 10 is nutationally stable for body spin rates $\omega''$ such that:

$$I_w \omega_w > \omega''(I_s - I_{t_m}) \qquad (2)$$

where $I_{t_m}$ is the greater of moments of inertia $I_{t_1}$, $I_{t_2}$ previously defined.

It is to be noted that the system described effects the desired orientation of the satellite from the attitude in which the maximum moment of inertia was initally in alignment with the angular momentum vector to the position wherein the original spin axis becomes prepenndicular to the angular momentum vector of the vehicle, the total momentum of the system being equal to the original momentum of the system, with the redistribution of the momentum as indicated by Equation (1), indicated above. Thus, as indicated by Equation (1), the total angular momentum of the vehicle in the final position (FIG. 5) comprises that of the wheel summed with that of the body. In the initial state (FIG. 2), the angular momentum of the vehicle consisted solely of the momentum of the vehicle due to its spin about the initial spin axis 30, the momentum wheel 34 being de-energized, contributing no momentum to the system.

Figure 6:
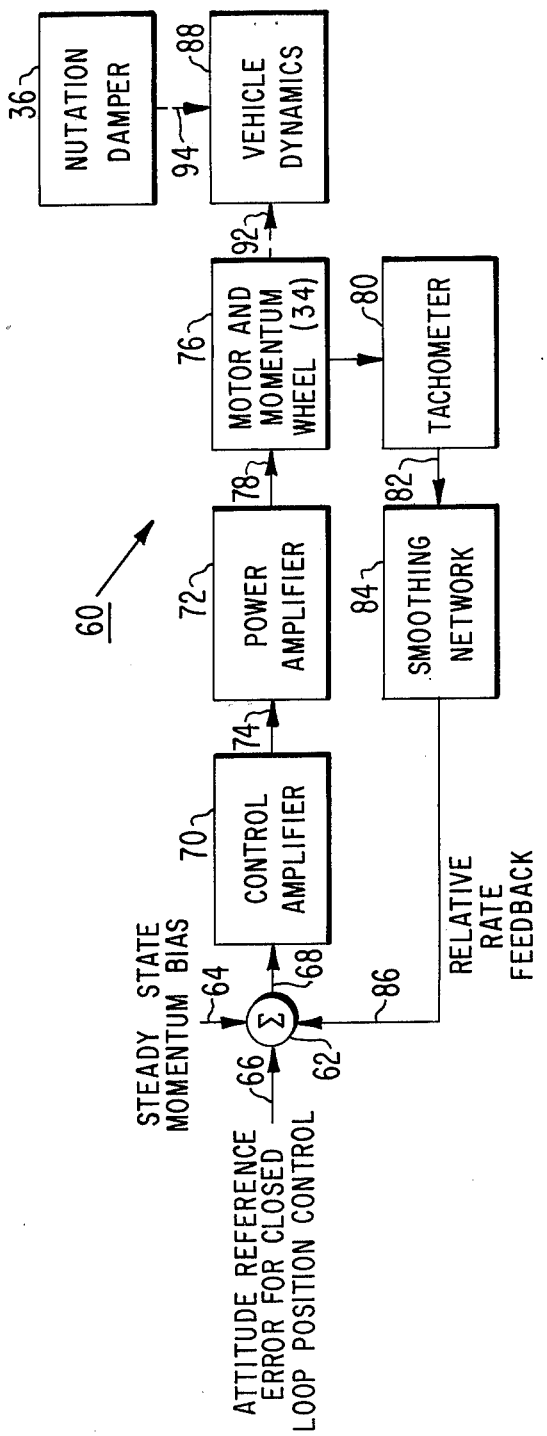
FIG. 6 is a simplified block diagram of the components of a spacecraft system required for the reorientation maneuver according to the invention.

As indicated previously, the vehicle in orbit includes many components not necessary for the operation of the orientation maneuver according to the present invention. There are certain essential elements of the satellite system, however, which are utilized to accomplish the orientation maneuver according to this invention. Those components are illustrated in the block schematic of FIG. 6. Block diagram of FIG. 6 is of conventional form illustrating a typical tachometer loop 60. Loop 60 is provided with a summer 62, suitably any known summing amplifier having an input 64 for applying a signal corresponding to the steady state momentum bias desired for the mission. Input control path 66 provides an optional input signal, corresponding to the attitude reference error, to the closed loop position control. Each of the signals on path 64 and 66 are of suitable form well known in the art being typically analog voltages. The third input to summer 62 is a relative rate feedback signal conducted over path 86 and generated as an error signal from the tachometer loop 60. The output of the summer 62 indicative of an error voltage, and thus, indicative of a change in the momentum wheel speed is applied to a control amplifier 70 for generating a suitable signal representing the error signal from summer 62. The amplified sum signal is applied on path 74 to s suitable power amplifier 72 for amplifying the signal sufficiently to operate a motor for rotating the momentum wheel 34, this signal being applied to the motor 76 over path 78. Attached to the wheel 34 is a tachometer 80 which produces a series of digital pulses or analog signals corresponding to the rotation speed of the momentum wheel 34. The output of the tachometer is applied over path 82 to a suitable smoothing network 84 for converting pulses if the tachometer is the type providing output pulses or suitably a smoothing network if the output of the tachometer provides analog signals. Network 84 provides such a corrected signal over path 86 to close the loop back to summer 62. The energization of the momentum wheel 84 affects the vehicle dynamics indicated by block 88 over path 92. The vehicle dynamics is affected by the nutation damper 86 as indicated by the path 94.

The operation of the tachometer loop 60 will be apparent in view of the previous discussion for effecting the desired re-orientation of the spacecraft or vehicle. In brief, when the momentum wheel 34 is energized by means of a signal over path 64 initiated, for example, by a command signal from ground command, the momentum wheel speed will be sensed by tachometer 80. The speed of the wheel thus is fed back to the summer 62 and compared to the control bias over path 64. When the two are equal, the control loop will be in sync condition whereby the speed of the wheel will be constant. Any deviation of the wheel speed will be corrected by changes in the signal passed from the summer through the control amplifier 70, and the power amplifier 72 to the motor in block 76.

It should be understood, that no external sensing or torquing is required to achieve the turn. Only the nutation damping by a passive damper such as damper 36 or damping effects supplied by the propellant tanks is required.

According to the present invention, one embodiment for which having been described, a spacecraft arranged to implement the invention provides several advantages. First an economical apogee motor can be used which employs only spin stabilization. This it will be appreciated is in contrast to the prior art which requires space vehicles that employ more complex guidance devices. Second, passive spin stabilization of the spacecraft throughout its transfer orbit and final orbit injection motor-firing minimizes the attitude control complexity and failure mode possibilities. Third, the maintenance of angular momentum throughout the re-orientation maneuver ensures that the final attitude of the spacecraft will be in the desired direction without any dependence upon precision measurement for control of the attitude position or the rates of change of such attitude position, or both the position and its rate of change. Fourth, no additional hardware for control modes for the spacecraft are required other than the final on-orbit system of momentum wheel stabilization of the three axis controlled spacecraft.

What is claimed is:

1. A system for orienting the attitude of a spin-stabilized vehicle in a given orbit, said vehicle including a body, a nutation damper, and a momentum wheel, comprising:

means for spinning said vehicle at a first spin rate about a first axis comprising the maximum moment of inertia of said vehicle whereby said first axis is in alignment with the angular momentum vector of the vehicle, said momentum wheel being affixed to said body and oriented to spin about an axis perpendicular to said maximum moment of inertia axis, said perpendicular axis having a moment of inertia less than said maximum moment of inertia, means for reducing the spin rate of said vehicle from said first spin rate to a second spin rate such that the angular momentum of said vehicle about said first axis at said second spin rate is substantially equal to a predetermined angular momentum for said vehicle corresponding to a predetermined angular momentum of said vehicle in said given orbit, means for energizing said momentum wheel to rotate at a rate sufficient to provide and maintain nutational stability of said vehicle whereby said vehicle is effected to move initially in a divergent spiral through an angle in inertial space such that said momentum wheel axis and said transverse axis move toward said angular momentum vector in a converging spiral, and the spin rate of said body about said transverse axis is reduced to a third spin rate, said third spin rate being less than either of said first and second spin rates, means for moving said transverse axis towards and maintaining coincidence with said angular momentum vector of said vehicle and moving said momentum wheel axis towards and maintaining a parallel relation with said angular momentum vector, said movement comprising damping of nutation by said nutation damper, the angular momentum of said wheel being greater than the product of said third spin rate times the difference between said maximum moment of inertia and said transverse moment of inertia of said vehicle.

2. A system according to claim 1 wherein said spinning means comprises propulsion thrusters on said vehicle.

3. A system according to claim 1 wherein said damping of nutation is achieved by a passive nutation damper.

4. A method for orienting the attitude of a spin-stabilized vehicle in a given orbit comprising the steps of:

spinning said vehicle at a first spin rate about a first axis comprising the maximum moment of inertia of said vehicle whereby the angular momentum vector of the vehicle is in alignment with said axis, reducing the spin rate of said vehicle from said first spin rate to a second spin rate such that the moment of inertia of said vehicle about said first axis is substantially equal to a predetermined moment of inertia for said vehicle corresponding to the in-orbit requirements, and spinning a momentum wheel about an axis perpendicular to said maximum moment of inertia axis whereby said vehicle is maneuvered such that said momentum wheel axis tends towards being parallel to said angular momentum vector, reducing the nutation of the vehicle in the final portion of the maneuver such that the momentum wheel axis is placed parallel with said momentum vector.

* * * * *

UNITED STATES PATENT OFFICE
CERTIFICATE OF CORRECTION

PATENT NO. : 3,940,096

DATED : February 24, 1976

INVENTOR(S) : John Edward Keigler and Ludwig Muhlfelder

It is certified that error appears in the above-identified patent and that said Letters Patent are hereby corrected as shown below:

Column 2, line 36 "(II)" should be --(H)--;
Column 2, line 45 "3" should be --5--;
Column 4, line 19 "(11)" should be --(H)--.

Signed and Sealed this fourth Day of May 1976

[SEAL]

Attest:

RUTH C. MASON
Attesting Officer

C. MARSHALL DANN
Commissioner of Patents and Trademarks